(12) United States Patent
Cannon et al.

(10) Patent No.: US 9,338,850 B2
(45) Date of Patent: May 10, 2016

(54) LIGHTING SYSTEMS AND METHODS PROVIDING ACTIVE GLARE CONTROL

(71) Applicant: GE LIGHTING SOLUTIONS, LLC, East Cleveland, OH (US)

(72) Inventors: Neil P. Cannon, Eldorado Springs, CO (US); Jeffrey Bisberg, Boulder, CO (US); John Lembke, Boulder, CO (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/259,778

(22) Filed: Apr. 23, 2014

(65) Prior Publication Data

US 2014/0320023 A1    Oct. 30, 2014

Related U.S. Application Data

(60) Provisional application No. 61/815,715, filed on Apr. 24, 2013.

(51) Int. Cl.
  *H05B 37/02* (2006.01)
  *H05B 33/08* (2006.01)
(52) U.S. Cl.
  CPC ........ *H05B 33/0854* (2013.01); *H05B 33/0842* (2013.01); *H05B 37/0227* (2013.01); *H05B 37/0245* (2013.01)
(58) Field of Classification Search
  USPC ........... 315/291, 307; 362/235, 237, 238, 239
  See application file for complete search history.

(56) References Cited

U.S. PATENT DOCUMENTS

| 6,957,775 | B2* | 10/2005 | Tsikos et al. | 235/462.01 |
| 8,379,302 | B2* | 2/2013 | Kuhlman et al. | 359/358 |
| 2006/0044800 | A1 | 3/2006 | Reime | |
| 2006/0245189 | A1* | 11/2006 | Gordin | 362/234 |

(Continued)

FOREIGN PATENT DOCUMENTS

| ES | 2 245 870 A1 | 1/2006 |
| WO | 03098977 A1 | 11/2003 |

(Continued)

OTHER PUBLICATIONS

PCT International Search Report and Written Opinion issued in connection with WO Application No. PCT/US14/035248 dated Oct. 7, 2014.

(Continued)

*Primary Examiner* — Minh D A
(74) *Attorney, Agent, or Firm* — GE Global Patent Operation; Peter T. DiMauro

(57) ABSTRACT

A light fixture includes a dimmable light source that emits light downwardly, and a downward-looking rangefinder proximate and operatively coupled with the light source. When the rangefinder detects an object at a measured height that exceeds a first threshold, the light source dims according to the measured height. A light fixture that provides illumination with active glare control for a lighted area includes one or more first light sources that emit high-angle light, and one or more dimmable second light sources that emit low-angle light, into the lighted area. The system also includes a camera that captures images of the lighted area, and an controller that is (a) operable to identify one or more activity locations within the lighted area from the images, and (b) operatively coupled to dim one or more of the light sources that illuminate the one or more activity locations.

14 Claims, 11 Drawing Sheets

(56) References Cited

U.S. PATENT DOCUMENTS

2012/0271511 A1* 10/2012 Dierks et al. .................. 701/36
2012/0306382 A1* 12/2012 Maxik et al. .................. 315/152
2013/0082606 A1    4/2013 Viner et al.

FOREIGN PATENT DOCUMENTS

| WO | 2008/135942 A1 | 11/2008 |
|---|---|---|
| WO | 2011037993 A2 | 3/2011 |
| WO | 2011055261 A1 | 12/2011 |

OTHER PUBLICATIONS

Invitation to Pay Additional Fees issued in connection with WO Application No. PCT/US2014/035248 dated Aug. 25, 2014.

* cited by examiner

LIGHTING SYSTEMS AND METHODS PROVIDING ACTIVE GLARE CONTROL

RELATED APPLICATIONS

This application claims the benefit of priority to U.S. Provisional Application Ser. No. 61/815,715, filed Apr. 24, 2013, and which is incorporated by reference herein.

BACKGROUND

Glare is a common problem in the natural world and in many lighting situations. Sometimes glare is a result of a light source in close physical proximity to an object being viewed. Other times the light source is not physically close to an object but is behind it such that the source is in the same field of view as the object with respect to a viewer. Humans and certain animals have facial shapes and features such as eyebrows that form natural glare shields such that high-angle light (light that forms a high-angle with respect to the horizon) is not visually bothersome. For example, effects of glare are readily observed outdoors early or late on a sunny day. When an observer or photographer faces the Sun the glare may be bothersome and objects may be difficult to view/photograph because of the high contrast between the Sun and the objects, seen on their shadowed sides. When the observer/photographer faces away from the Sun, all objects appear well lit and the observer/photographer does not have to shield or screen his eyes/camera from the direct glare of sunlight.

Light fixtures that primarily direct high-angle light downwardly may not present glare to observers who do not look directly up into the light fixture, but such fixtures may illuminate only small areas. Other light fixtures that direct light into a wide-angle, or low-angle, may illuminate larger areas, but may present glare to observers at a distance. In certain situations, an observer must look at an object that is near a light source, such that light from the light source is likely to be in the observer's field of view.

SUMMARY

In an embodiment, a range-activated dimming light fixture providing active glare control, includes a first dimmable light source for downwardly illuminating an activity volume terminating at a support surface; and a rangefinder, operatively coupled with the first dimmable light source, for determining a distance between the first dimmable light source and a top of an object within the activity volume; and, a controller for determining a height between the top and the support surface, based on the distance, and configured to dim the first dimmable light source when the height exceeds a first threshold distance.

In another embodiment, a lighting system for illuminating an activity volume and providing active glare control includes a first light fixture having: a first light source for illuminating a first portion of the activity volume, and a dimmable light source for illuminating a second portion of the activity volume that is different from the first portion; a sensor for capturing data of the activity volume; and a controller for (a) determining, from the data, an activity location on a support surface terminating the activity volume, and (b) dimming the dimmable light source when the activity location is within the second portion.

In another embodiment, a method for illuminating of an activity volume with active glare control includes simultaneously illuminating first and second portions, using respective first and second light sources, of an activity volume terminating at a support surface, the first and second portions being different; determining at least one activity location on the support surface; and dimming the second light source when the activity location is within the second portion.

DETAILED DESCRIPTION OF DRAWINGS

Figure 1:
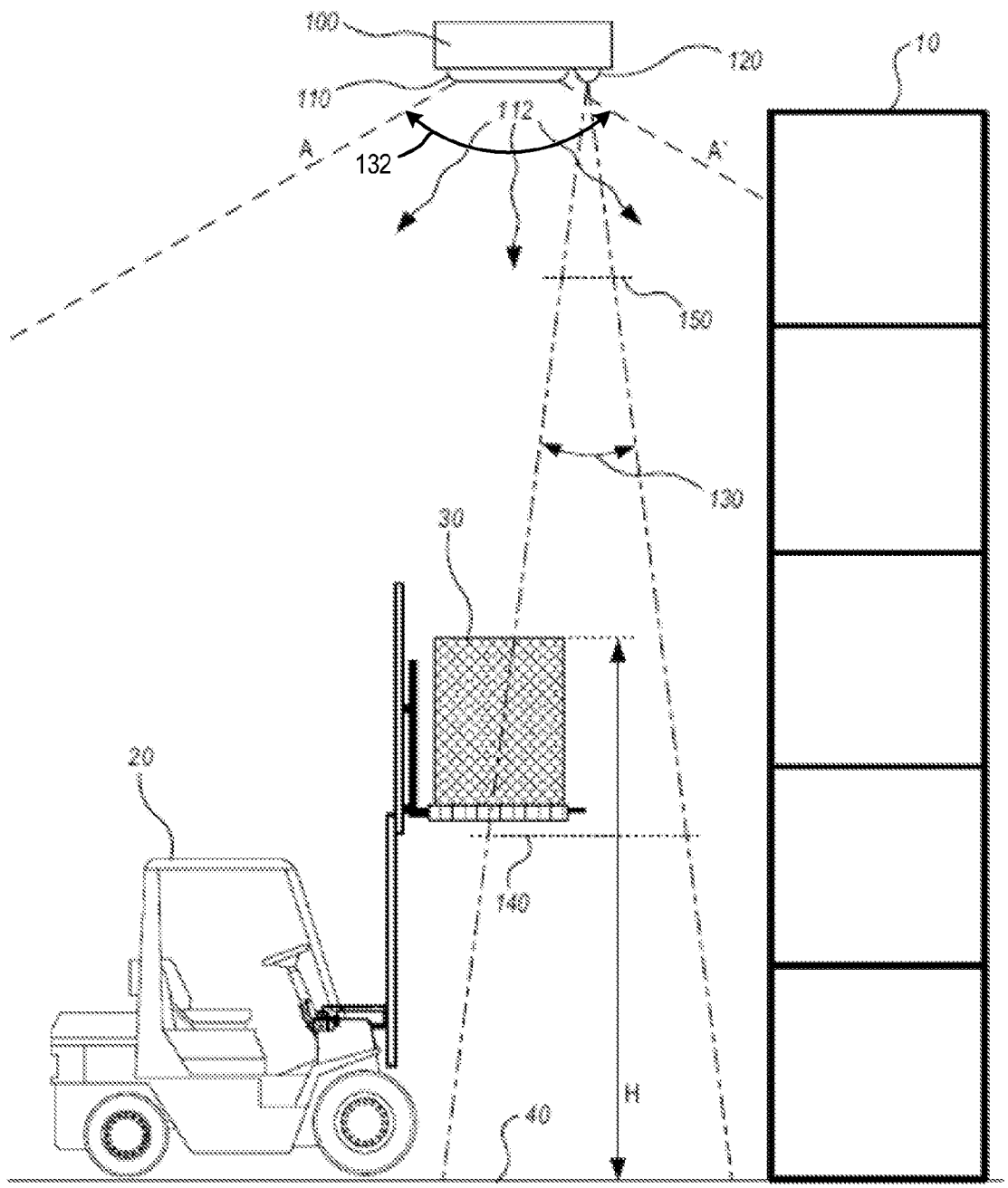
FIG. 1 schematically illustrates a range-activated light fixture that provides active glare control, in an embodiment.

The present disclosure may be understood by reference to the following detailed description taken in conjunction with the drawings briefly described below. It is noted that, for purposes of illustrative clarity, certain elements in the drawings may not be drawn to scale.

FIG. 1 schematically illustrates a range-activated light fixture 100 that provides active glare control, in an embodiment. Light fixture 100 includes a dimmable light source 110 and a rangefinder 120. Dimmable light source 110 illuminates a nearby activity volume terminating at a support surface 40. As illustrated in FIG. 1, dimmable light source 110 illuminates the volume between dashed lines A and A', terminating at support surface 40. Within FIG. 1, a forklift 20 bearing an object 30 being loaded into storage rack 10 is located within the activity volume. Light 112 from light source 110 is generally at an angular illumination 132 between broken lines A, A'; but light emitted by light fixtures herein may be emitted through greater or smaller illumination angles than shown in FIG. 1, and may not form a precisely defined edge as suggested by lines A, A'. Rangefinder 120 identifies distance from light fixture 100 to the top of the nearest object (and, accordingly, measures height of the object) within a narrow field of view 130 that may, for example, subtend a cross sectional angle of 15 degrees. Accordingly, rangefinder 120 may have a field of view 130 that is narrower than an angular illumination of dimmable light source 110.

Light fixture 100 includes a controller that operates to dim light 112 when rangefinder 120 determines that an object is near to light fixture 100, thus reducing glare in a forklift operator's field of view as objects are lifted towards the light fixture. For example, light fixture 100 may dim light 112 whenever rangefinder 120 finds any object within field of view 130 that has a measured height that is above a floor 40, or in other words when the top of object 30 exceeds a first threshold distance 140 from support surface 40. In this sense, light fixture 100 may regard support surface 40 as one height threshold for purposes of dimming light 112. In another example, light fixture 100 is configured to only dim light 112 when measured height of an object exceeds a first height threshold 140 that is higher than typical traffic (e.g., humans, or vehicles that are not deliberately raised). In FIG. 1, object 30 is shown at a measured height H that exceeds first height threshold 140, so light 112 would be dimmed accordingly.

Light fixture 100 may dim light 112 stepwise or in relation to height of an object within field of view 130. That is, light fixture 100 may dim light 112 to a single predetermined brightness whenever rangefinder 120 determines that a measured height of any object exceeds first height threshold 140. Alternatively, rangefinder 120 may provide a height measurement that is subsequently processed to determine a degree of dimming to be implemented on light source 110. When light fixture 100 dims light 112 in relation to height of an object, such dimming may increase until light source 110 is at a minimum brightness level. For example, the minimum brightness level may correspond to: the light source 110 turning completely off; or light source 110 may remain on at a level effective to reduce glare; or may remain on at some very low level (e.g., 1% to 10% of its full brightness). Light fixture 100 may also dim light 112 in relation to measured height of an object until the object reaches a second height threshold 150, but then may not dim light 112 further as the measured height of the object exceeds second height threshold 150. Light source 110 may be of any type that is dimmable; in particular, light-emitting diode (LED) based light sources 110 may provide the benefits of being both energy efficient and dimmable over a large range of brightness without compromising reliability or energy efficiency.

Figure 2:
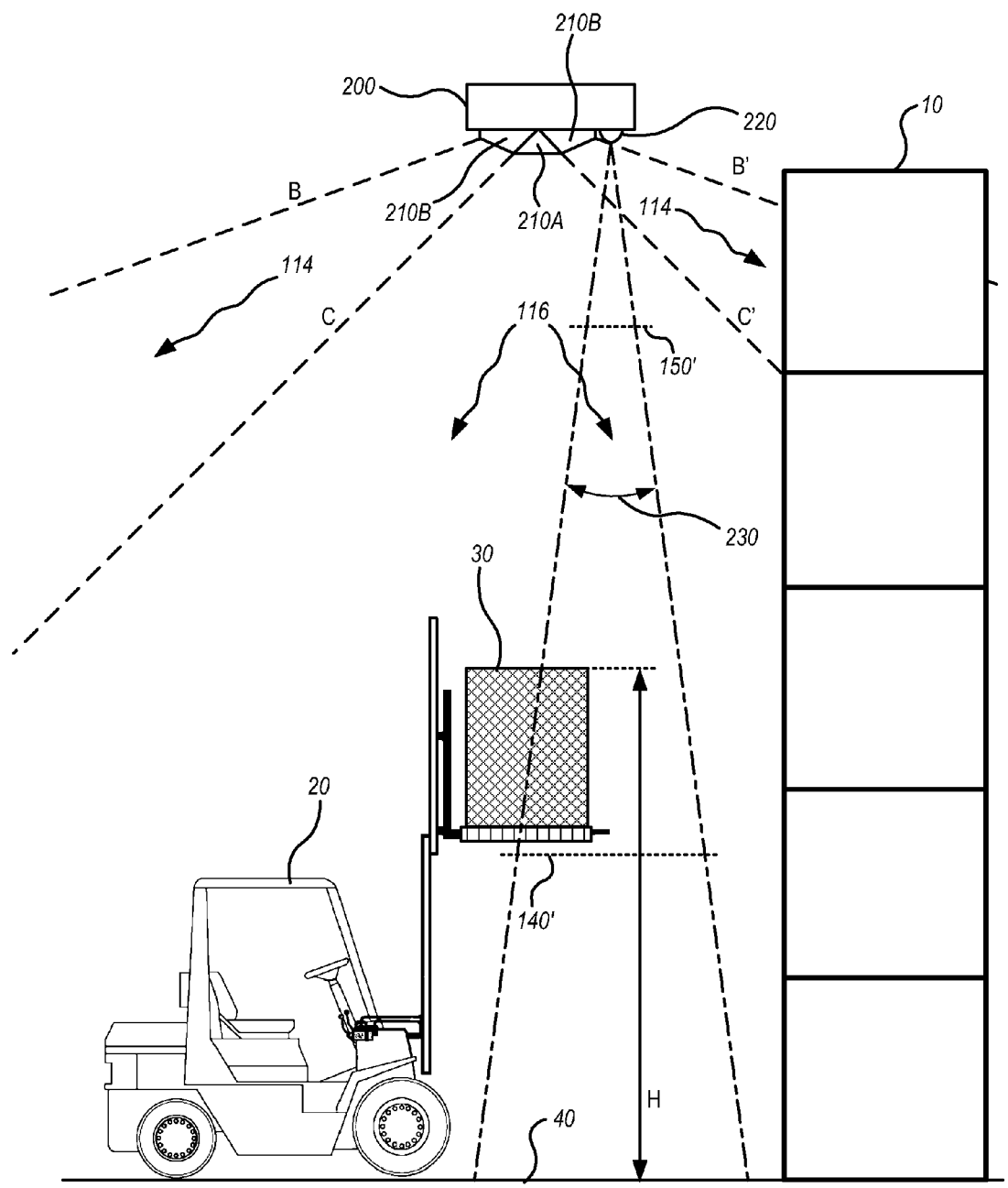
FIG. 2 schematically illustrates another range-activated light fixture that provides active glare control, in an embodiment.
Figure 3A:
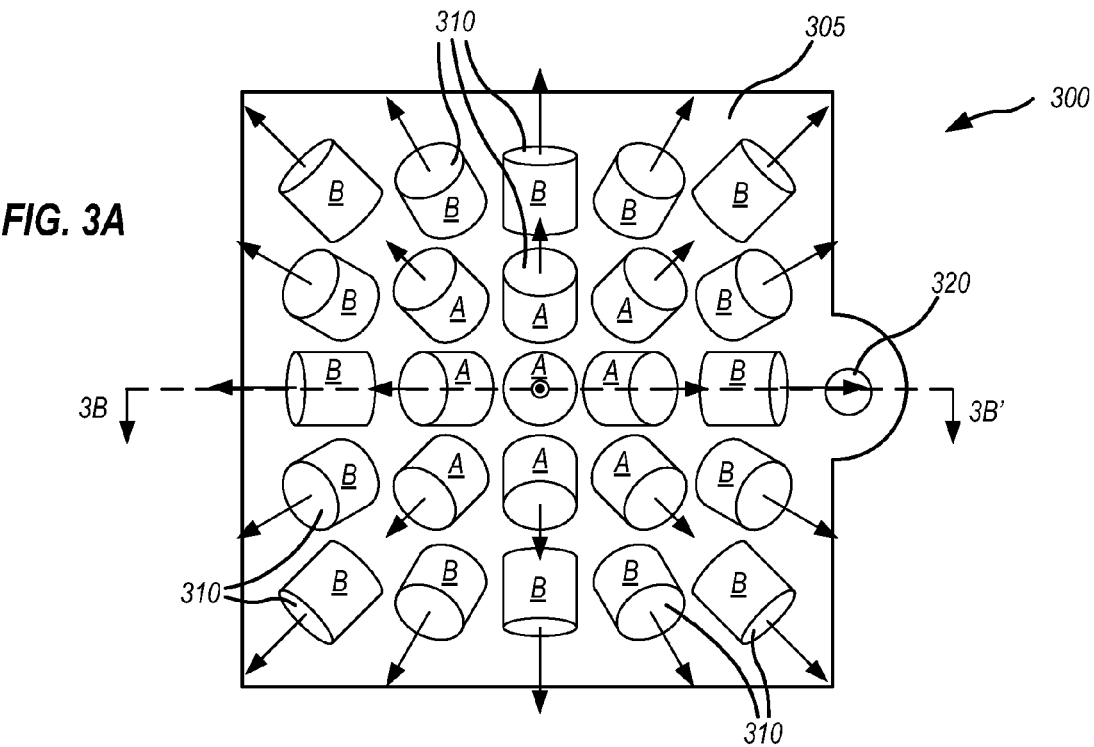
FIG. 3A is a schematic bottom plan view of a light fixture that includes individual light sources, in an embodiment.
Figure 3B:
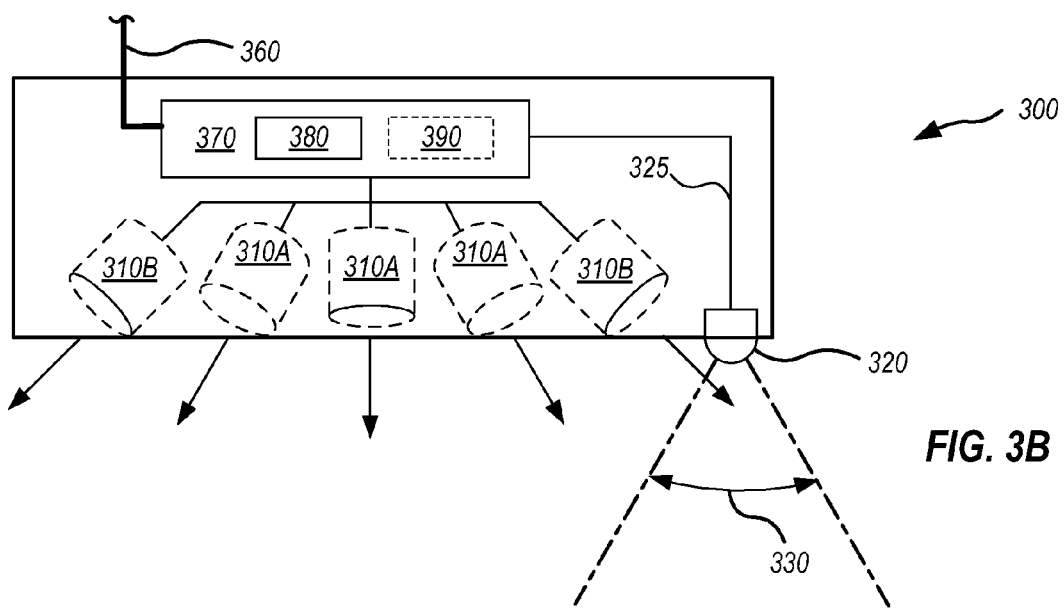
FIG. 3B is a schematic cross sectional view of the light fixture of FIG. 3A.

FIG. 2 schematically illustrates a light fixture 200 that provides active glare control, in an embodiment. Light fixture 200 includes light sources 210A and 210B and a rangefinder 220. Light source 210B may, for example, extend around a periphery of light source 210A, and may be formed as a single operative light source or by a plurality of sources acting together (as shown in FIGS. 3A, 3B). Light sources 210A, 210B emit light 116, 114 respectively into a nearby volume terminating at a support surface 40. For example, first dimmable light source 210A may illuminate activity volume between dashed lines C and C'; and second light source 210B may illuminate outside of the activity volume (or between lines B and C, and B' and C'). Again the activity volume between lines C and C' may include a forklift 20 bearing an object 30 being loaded into storage rack 10.

Light 116 emits at a high-angle range, that is, a range which may be within about 45 degrees of vertical with respect to floor 40. In other words, light 116 emitted at high-angle range has a light radiation pattern pointed downwardly approximately within 45 degrees from normal of light source 210A within FIG. 2. In certain embodiments, light 116 from first dimmable light source 210A emits at a solid angle corresponding to pi steradians. However, light source 210A may emit at greater or smaller solid angles, or at different radiation patterns without departing from the scope hereof.

Light 114 emits at low-angle range(s) that are substantially outside of the angular illumination of light 116 from first dimmable light source 210A—that is, in one example exceeding about 45 degrees from the vertical. In other words, light 114 emitted at a low-angle range has a light radiation pattern pointed approximately greater than 45 degrees from normal of light source 210A. Accordingly, within FIG. 2, light 114 emits roughly between broken lines B and C, B' and C' (therefore at low-angle outside the activity volume), and light 116 emits roughly between broken lines C and C' (therefore at high-angle within activity volume). It is understood that light 114, 116 may be emitted having radiation patterns that encompass larger or smaller angular illumination than are shown in FIG. 2, and may not form precisely defined edges as suggested by lines B, B', C and C'. For example, the angular illumination range of light 114 may partially overlap the angular illumination range of light 116. Rangefinder 220 identifies distance from light fixture 200 to the nearest object (and, accordingly, measures height of the object) within a narrow field of view 230 that may, for example, subtend a cross sectional angle of 15 degrees (for example, the field of view 230 may be more narrow than a field of view of the light source 210A).

Light fixture 200 includes a controller that operates to selectively dim dimmable light source 210A when rangefinder 120 determines that an object is near to light fixture 200, thus reducing glare in a forklift operator's field of view as objects are lifted towards the light fixture. Operation of dimmable light source 210 is similar to operation of light source 110 of light fixture 100, described above, with respect to measured heights determined by rangefinder 220 as compared to height thresholds 140', 150'. However, light source 210B remains on at full intensity while light source 210A dims light 116. Light 114 therefore continues to provide low-angle illumination outside of the activity volume, for example to serve as local task lighting for an operator of forklift 20, as load 30 is maneuvered into an elevated portion of storage rack 10. Light sources 210A and 210B may be of any type that is dimmable; in particular, light-emitting diode (LED) based light sources 210 may provide the benefits of being both energy efficient and dimmable over a large range of brightness without compromising reliability or energy efficiency.

FIGS. 1 and 2 illustrate systems providing active glare control that may be implemented utilizing a rangefinder that identifies a height of any object within its field of view. Such a rangefinder may for example constantly provide an output distance, which will correspond to a distance from the floor to the rangefinder when no other objects intervene, or will correspond to some smaller distance when there is any intervening object within its field of view. Rangefinders 120 and 220 may be any sensor capable of determining height of object 30, such as ultrasonic, radar, laser, camera, or other sensing devices. Systems that are more sophisticated are possible where a rangefinder can provide output with greater specificity, that is, where the rangefinder can distinguish among various locations in its field of view. Systems that can provide the capabilities illustrated in FIGS. 1 and 2, and other embodiments, are discussed in further detail below.

FIG. 3A is a schematic bottom plan view of a light fixture 300 that includes individual light sources denoted 310A, 310B (representative sources are indicated as elements 310; each individual source 310A or 310B is labeled simply as A or B in FIG. 3A for clarity of illustration). Light fixture 300 is an example of light fixture 200 (FIG. 2). Light sources 310A, 310B emit light in the directions shown by arrows. In general, sources 310A emit light at high (near vertical) angles and sources 310B emit light at low-angles; sources 310A and 310B (or groups thereof) can for example act as sources 210A and 210B (FIG. 2) respectively. A broken line 3B-3B' indicates a plane shown in the schematic view of FIG. 3B. Light fixture 300 also includes a rangefinder 320 (similar to rangefinder 120 and 220 discussed above) and a housing 305. Shapes of light fixture 300, housing 305, and shapes, relative number and positions of light sources 310A and 310B and rangefinder 320, are illustrative only; it is appreciated that light fixture 300 could have different numbers, shapes and positions of all such components thereof. Furthermore the concepts illustrated are not limited to a simple two way division between high and low-angle light but may be applied to lighting of various angles with respect to both a viewer and objects viewed by the viewer.

FIG. 3B is a schematic cross sectional view of light fixture 300 along line 3B-3B' shown in FIG. 3A. Light fixture 300 includes electronics 370 that are powered by power lines 360, and that in turn, power light sources 310A, 310B. Light fixture 300 also includes rangefinder 320 that supplies range information 325 to electronics 370. Electronics 370 include a controller 380 that utilizes range information 325 to determine if (and optionally, how much) light sources 310A should be dimmed due to an object in a field of view 330 of rangefinder 320. Electronics 370 may also include an optional memory 390 for storing software, user preferences or other information desired for operation of light fixture 300.

Figure 4:
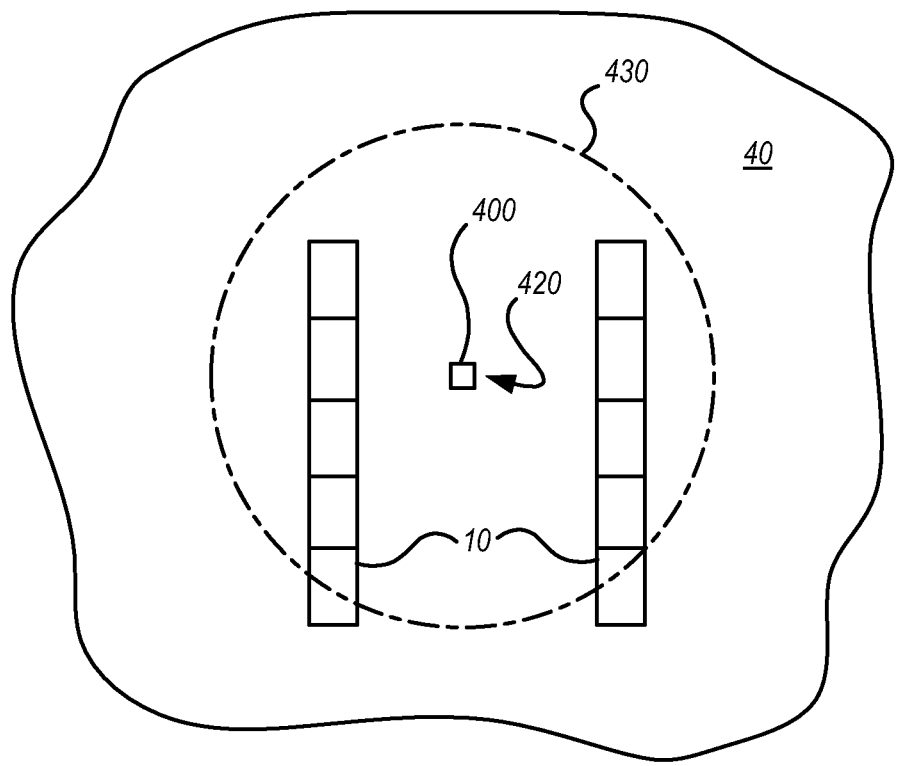
FIG. 4 is a schematic plan view illustrating a field of view of a rangefinder of a range-activated light fixture, in an embodiment.

FIG. 4 is a schematic plan view illustrating a field of view 430 of a rangefinder 420 of a light fixture 400. Light fixture 400 is for example ceiling mounted or suspended over support surface 40 such that rangefinder 420 (obscured in the view of FIG. 4, because it faces downwardly from light fixture 400) can locate objects within field of view 430. However, field of view 430 may include fixed features such as storage racks 10 within field of view 430. While it a desirable embodiment dims at least high-angle light emitted downwardly in an activity volume from light fixture 400 when objects are detected with a high measured height within field of view 430, the presence of storage racks 10 in field of view 430 would result in such high-angle light being constantly dimmed. This result is addressed by customizing the action taken by light fixture 400 in response to objects within selected portions of field of view 430, as discussed below.

Figure 5:
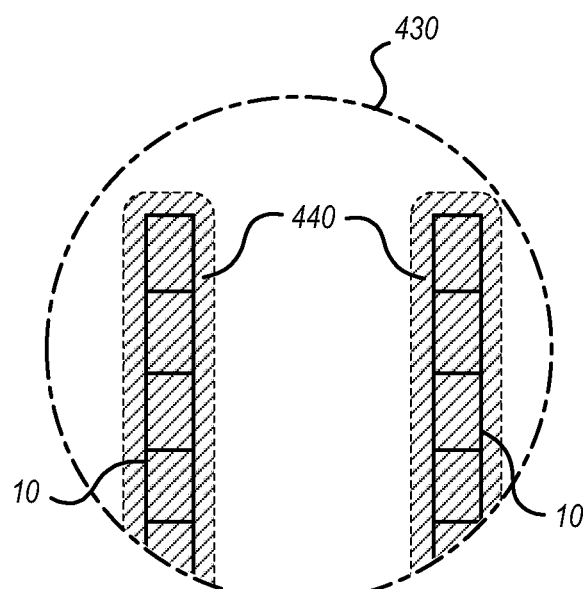
FIG. 5 is a schematic illustration of a field of view of a rangefinder, given the arrangement depicted in FIG. 4, in an embodiment.

FIG. 5 is a schematic illustration of field of view 430 of rangefinder 420, given the arrangement depicted in FIG. 4. Field of view 430 includes "don't-care" regions 440 corresponding to locations of storage racks 10 under light fixture 400. Light fixture 400 dims at least high-angle light emitted therefrom when rangefinder 430 detects objects at a high measured height within field of view 430 except when such objects exist solely within don't-care regions 440. Don't-care regions 440 may be, for example, identified and programmed into a memory of light fixture 400 (e.g., memory 390 of light fixture 300, FIG. 3B).

Figure 6A:
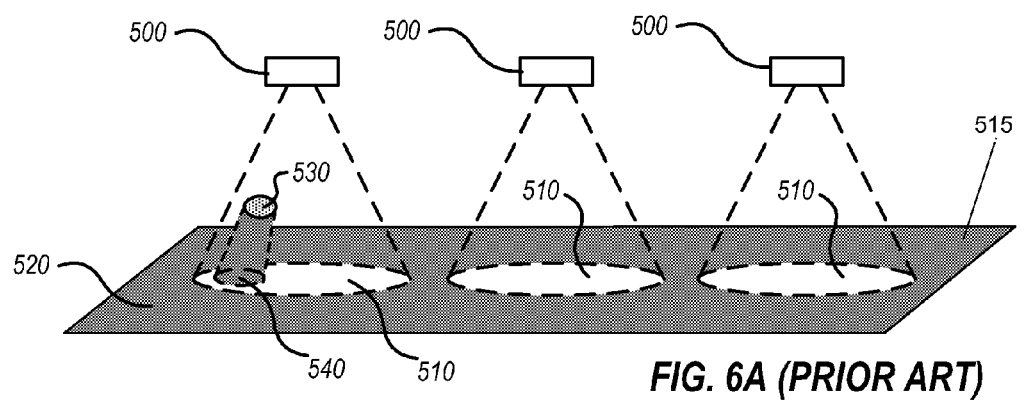
FIG. 6A is a schematic illustration of prior art light fixtures illuminating a surface.

FIG. 6A is a schematic illustration of prior art light fixtures 500 illuminating a surface 520. Each light fixture 500 generates a lighted region 510, as shown, however it is understood that regions 510 may or may not form definite boundaries as suggested by FIG. 6A. For example, light fixtures 500 provide substantial downward collimation of the emitted light such that lighted regions 510 have definite boundaries (that is, the unlit area around lighted regions 510 is quite dark). An increasing degree of downward collimation results in little low-angle light to form glare, but also results in small lighted regions 510. Increasing downward collimation also results in an increasing tendency to generate (a) high contrast between regions 510 and unlighted regions 515 of surface 520, and (b) dark shadows 540 under any objects 530 that may be within each region 510.

Figure 6B:
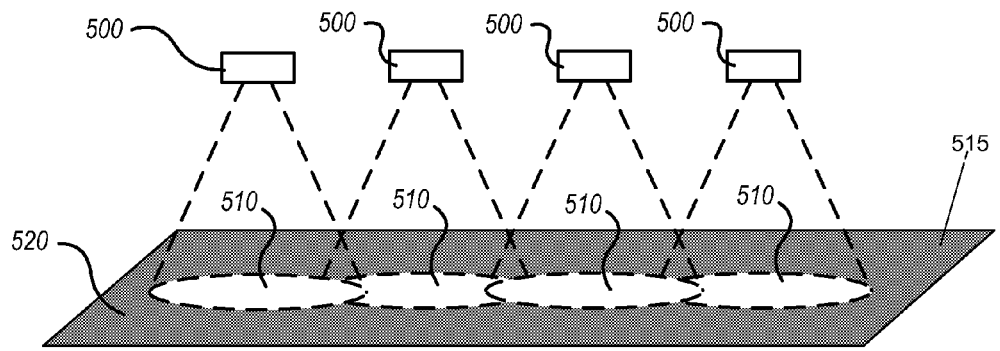
FIG. 6B is a schematic illustration of prior art light fixtures spaced so as to illuminate a portion of the surface of FIG. 6A more intensely and/or continuously.

FIG. 6B is a schematic illustration of prior art light fixtures 500 spaced so as to illuminate a portion of surface 520 more intensely and/or continuously. As per the discussion of FIG. 6A, regions 510 in FIG. 6B may form diffuse boundaries, definite boundaries or no boundaries, such that the illuminated area may range from the regions 510 shown, to more or less diffusely bounded lighted areas. However, since the light fixtures 500 have about the same downward collimation as those shown in FIG. 6A, strong shadows will be created underneath any illuminated objects, and because lighted regions 510 remain small, many fixtures 500 are required to illuminate a given area.

Figure 6C:
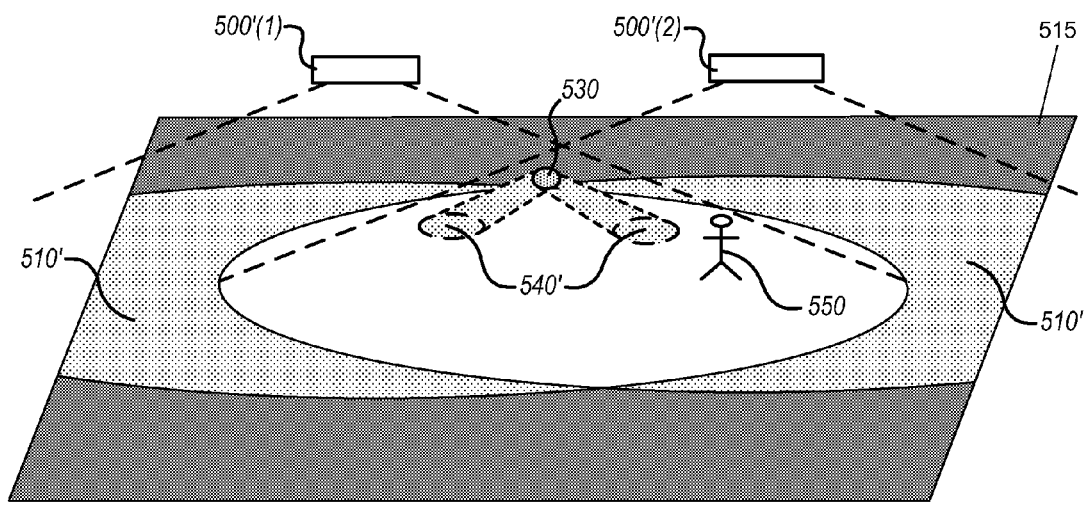
FIG. 6C shows prior art light fixtures and that are configured for less downwardly collimated illumination than the light fixtures of FIGS. 6A and 6B, and thus form larger lighted regions.

FIG. 6C shows prior art light fixtures 500'(1) and 500'(2) that are configured for less downwardly collimated illumination than light fixtures 500, and thus form larger lighted regions 510' and further overlap in overlap lighted region 560. When utilized in multiples, as shown, light fixtures 500' may produce shadows 540' that are not as dark as shadow 540 shown in FIG. 6A, because adjacent lights at least partially illuminate areas underneath objects 530. In addition, fewer fixtures 500' may be required to illuminate a given area, as compared with fixtures 500. However, light fixtures 500' produce significant low-angle light, such that each light fixture 500' forms unwanted glare to observers that are at a distance. For example, a person 550 is shown underneath fixture 500' (2), yet is also within a volume illuminated by low-angle rays from light fixture 500'(1), resulting in unwanted glare being perceived by person 550.

Figure 7:
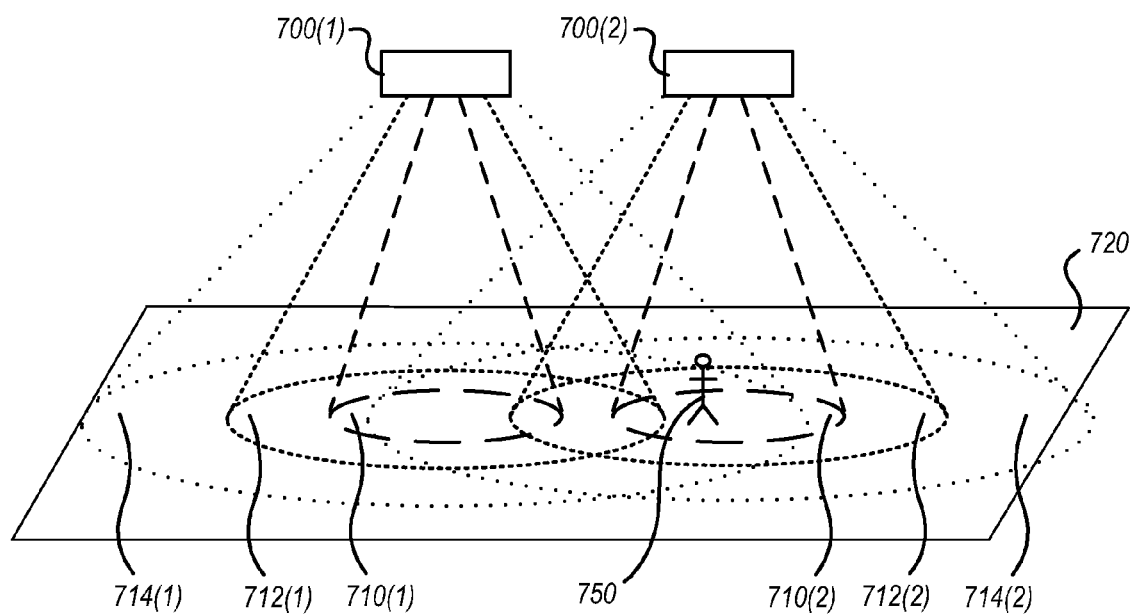
FIG. 7 is a schematic illustration of light fixtures that provide active glare control, illuminating a surface, in an embodiment.

FIG. 7 is a schematic illustration of light fixtures 700(1), 700(2) that provide active glare control, illuminating a surface 720. Light fixture 700(1) provides lighted regions 710 (1), 712(1) and 714(1), and light fixture 700(2) provides lighted regions 710(2), 712(2) and 714(2), as shown. Lighted regions 710-714 illuminate an activity volume terminating at a support surface. Each of light fixtures 700(1), 700(2) includes at least some light sources that are capable of being dimmed or turned off when an object is detected in an activity location on the support surface. That is, light fixtures 700 are capable of dimming at least respective lighted regions 714 when an object is detected therein. This provides the advantage that although the net illumination decreases somewhat by dimming one region 714, the light that is dimmed is that which is most directly responsible for glare, while light from other sources remains undimmed. Thus, overall illumination decreases only slightly, while glare decreases significantly. It should be appreciated that although only region 714 is discussed as being dimmed, other regions such as region 712 may be dimmed as well.

For example, as illustrated in FIG. 7, first light fixture 700(1) is adjacent to second light fixture 700(2), each of these fixtures 700 include a first light source downwardly illuminating a respective first portion 710(1) and 710(2) of the activity volume terminating at support surface 720, and a second light source illuminating a respective second portion 714(1) and 714(2) of the activity volume. Moreover, as illustrated the second portion 714(1) lighted by the second light source of the first fixture 700(1) at least partially overlaps with the first portion 710(2) lighted by the first light source of the second fixture 700(2). A controller, controlling fixtures 700, is capable of dimming the second portion 714(1) of fixture 700(1), while maintaining brightness of the first portion 710(2) of fixture 700(2). Fixtures 700 may include more light sources illuminating additional portions (i.e. portion 712) without departing from the scope hereof.

Figure 8A:
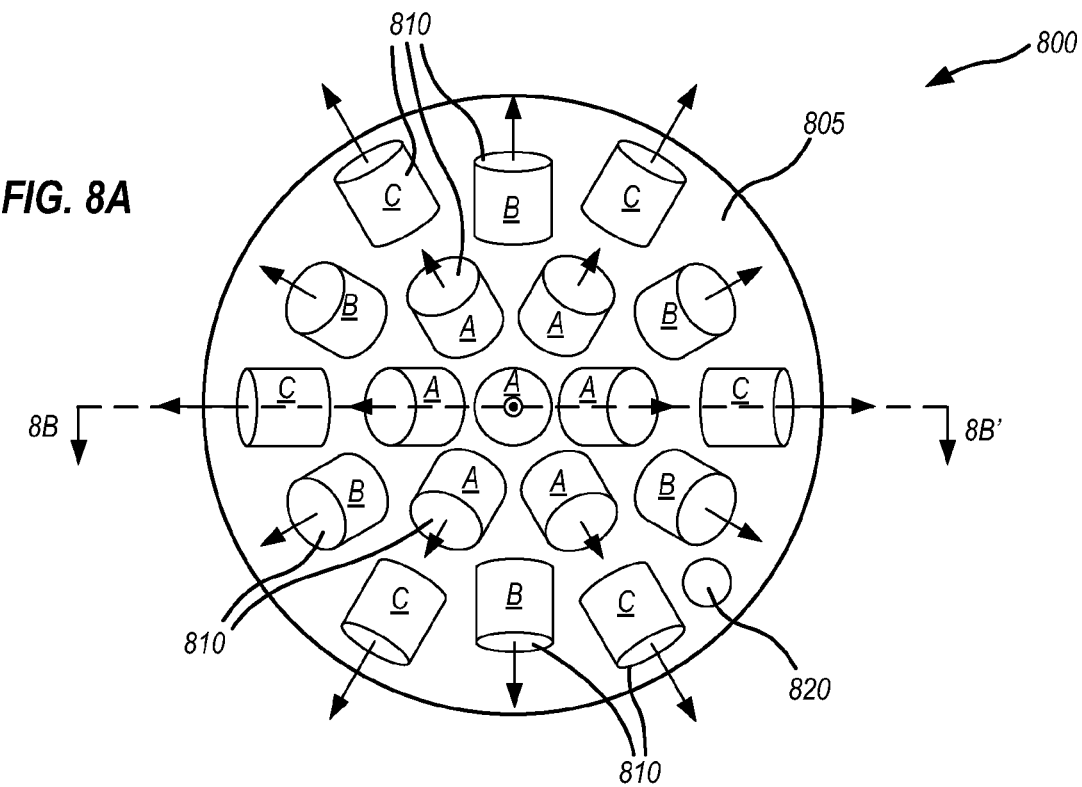
FIG. 8A is a schematic bottom plan view of a light fixture that provides active glare control, in an embodiment.

FIG. 8A is a schematic bottom plan view of a light fixture 800 that provides active glare control. Light fixture 800 includes individual light sources denoted 810A, 810B, 810C (representative sources are indicated as elements 810 in FIG. 8A, but each individual source 810A, 810B or 810C is labeled simply as A, B or C for clarity of illustration). A broken line 8B-8B' indicates a plane shown in the schematic view of FIG. 8B. Light fixture 800 can for example act as either or both of light fixtures 700 (FIG. 7).

Light sources 810A, 810B, 810C emit light in the directions shown by arrows. In general, sources 810A emit light at high (near vertical) angles, sources 810B emit light at medium-angles and sources 810C emit light at low-angles. That is, when light fixture 800 serves as one of light fixtures 700 (FIG. 7), light sources 810A illuminate lighted region 710 of an activity volume terminating at support surface 720, light sources 810B illuminate lighted region 712, and light sources 810C illuminate lighted region 714. Light sources 810A, 810B and 810C are for example of any type that is dimmable. In particular, light-emitting diode (LED) based light sources 810 provide the benefits of being both energy efficient and dimmable over a large range of brightness without compromising reliability or energy efficiency.

Light fixture 800 also includes a housing 805 and a camera 820. Camera 820 generates electronic data, e.g., electronic images, corresponding to at least part of the area illuminated by light sources 810A, 810B and 810C, and supplies the images to an controller that detects objects of interest within the field of view of camera 820, as discussed below. The shape of light fixture 800, housing 805, and the shapes, relative number and positions of light sources 810A, 810B and 810C and camera 820, are illustrative only; it is appreciated that light fixture 800 could have different numbers, shapes and positions of all such components thereof. In addition, light fixture 800 could have light sources aimed to provide more lighted regions than the three groups of light sources denoted as 810A, 810B and 810C. As a practical matter, when lighted regions are symmetric about the position of a light fixture, as shown in FIG. 7, it is expected that the maximum advantage will occur when an entire region to be illuminated is broken up into about three to five symmetric regions. Arrangement of light sources 810 to provide asymmetric lighted regions is also possible, as discussed further below.

Figure 8B:
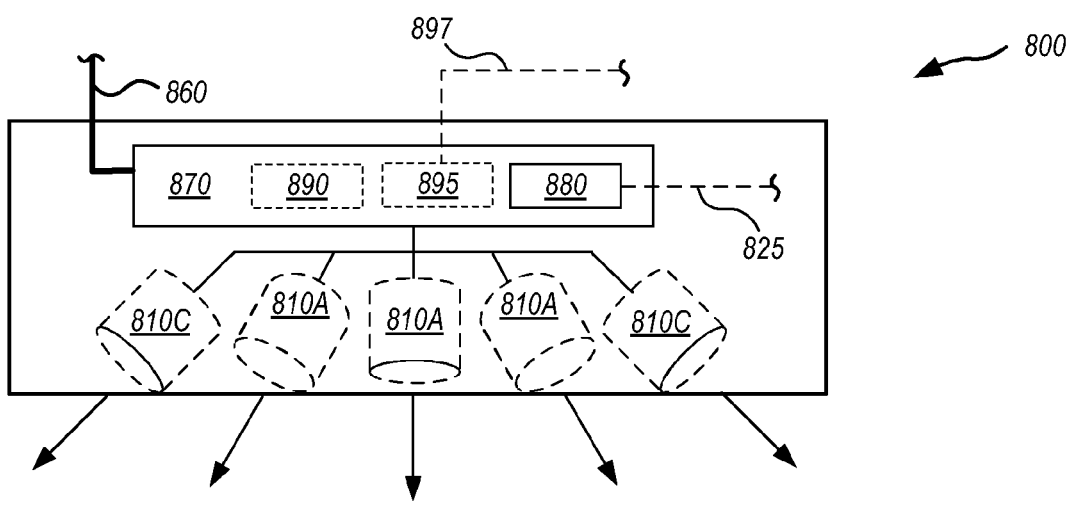
FIG. 8B is a schematic cross sectional view of the light fixture of FIG. 8A.

FIG. 8B is a schematic cross sectional view of light fixture 800 along line 8B-8B' shown in FIG. 8A. Light fixture 800 includes electronics 870 that are powered by power lines 860, and that in turn, provide power to light sources 810A, 810B and 810C. Camera 820 (FIG. 8A) supplies electronic data 825. Electronics 870 includes an controller 880 that utilizes electronic data 825 to determine if (and optionally, how much) any of light sources 810 should be dimmed due to an object of interest being identified in a field of view of camera 820 (FIG. 8A). For example, electronic data 825 may be image data collected from a camera.

Electronics 870 may also include an optional memory 890 for storing software, user preferences or other information desired for operation of light fixture 800, and/or an optional communication module 895 that transmits and/or receives information 897 to and from other light fixtures 800, a network or a host computer. Communication module 895 communicates over a fixed connection (e.g., wires or optical fibers) or wirelessly (e.g., over a wireless local area network (WLAN) such as Wi-Fi, WiMax, or similar systems, utilizing for example the IEEE 802.11 or 802.16 protocol families), or the combination of wired and wirelessly. Communication module 895 enables multiple light fixtures 800 to cooperate, for example to maintain at least some illumination from one or more light fixtures while selectively dimming low-angle rays from one or more light fixtures to reduce glare, as discussed below. Memory 890 may also assist in the cooperation, for example by storing information about the relative positions of neighboring light fixtures and/or lighted regions associated therewith, such that positions of objects of interest can be associated with the lighted regions that they are in or adjacent to.

Controller 880 processes electronic images 825 to identify presence and/or position of objects of interest in areas lighted by light fixture 800. Controller 880, for example, processes sequential ones of electronic images 825 to determine differences between the images that correspond to an object of interest. Additionally, controller 880 may identify objects of interest from single images based on known shapes or other properties. When an object of interest is located, its position is determined and correlated to known illumination areas (e.g., lighted regions 710, 712, 714 of FIG. 7) beneath light fixture 800. If controller 880 determines that an object of interest is within a region that is illuminated by low-angle rays (e.g., from light sources 810B or 810C), controller 880 can dim the corresponding light source to reduce intensity of the low-angle rays.

In a first example of operation, referring back to FIG. 7, assume that light fixture 700(1) is implemented by light fixture 800. A person 750 is shown at an activity location on support surface 720 that is within lighted region 714(1) associated with light fixture 700(1). Camera 820 captures electronic images 825, and controller 880 identifies person 750 as an object of interest on surface 720 within lighted region 714(1). Controller 880 then dims light sources 810C within light fixture 800 to reduce glare received by person 750.

In a second example of operation, again referring back to FIG. 7, assume that both of light fixtures 700(1) and 700(2) are implemented by light fixtures 800, and that both light fixtures have optional communication module 895 and thus share information 897 with one another. In addition, one or both of light fixtures 700(1) and 700(2) include memory 890 and position information of adjacent light fixtures stored therein. Camera 820 of light fixture 700(2) captures electronic images 825, and controller 880 identifies person 750 as an object of interest within lighted region 710(2). Because light fixture 700(2) stores position information of light fixture 700(1), it also determines that person 750 is within lighted region 714(1). Controller 880 in light fixture 700(2) determines that lighted region 714(1) should be dimmed, and sends a command to do so in the form of information 897 to light fixture 700(1) to dim light sources 810C therein.

Figure 9A:
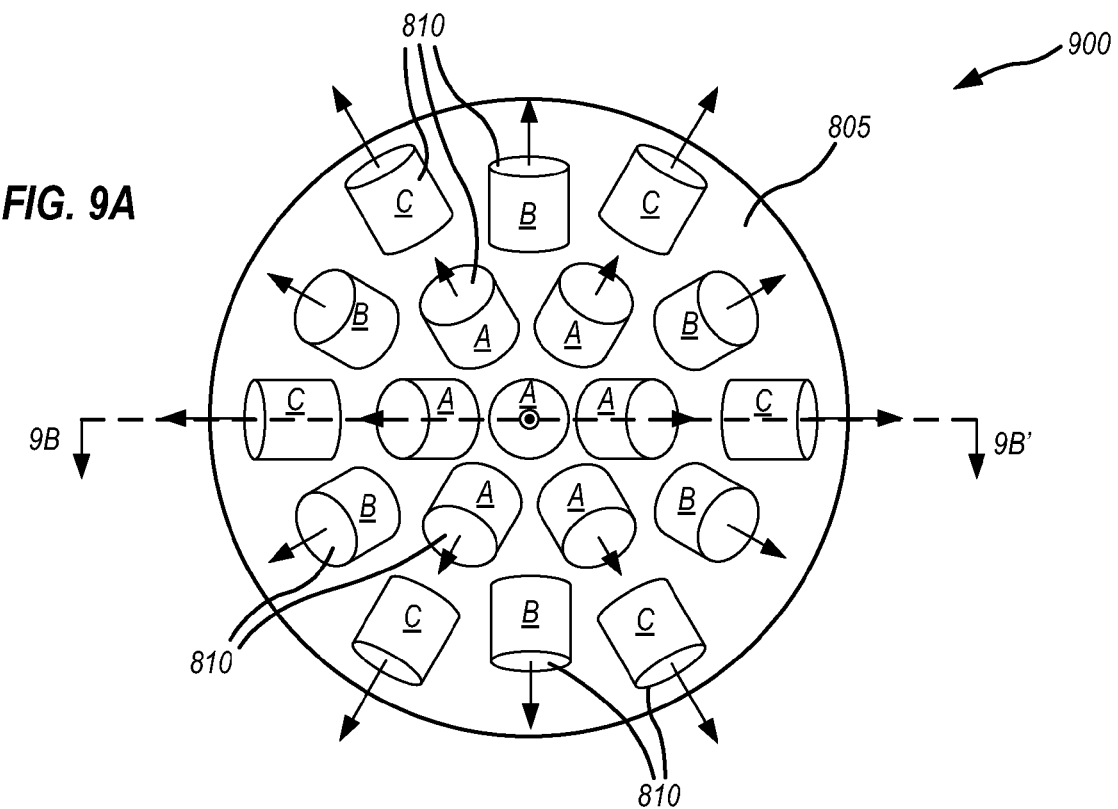
FIG. 9A is a schematic bottom plan view of a "slave" light fixture that provides active glare control, in an embodiment.
Figure 9B:
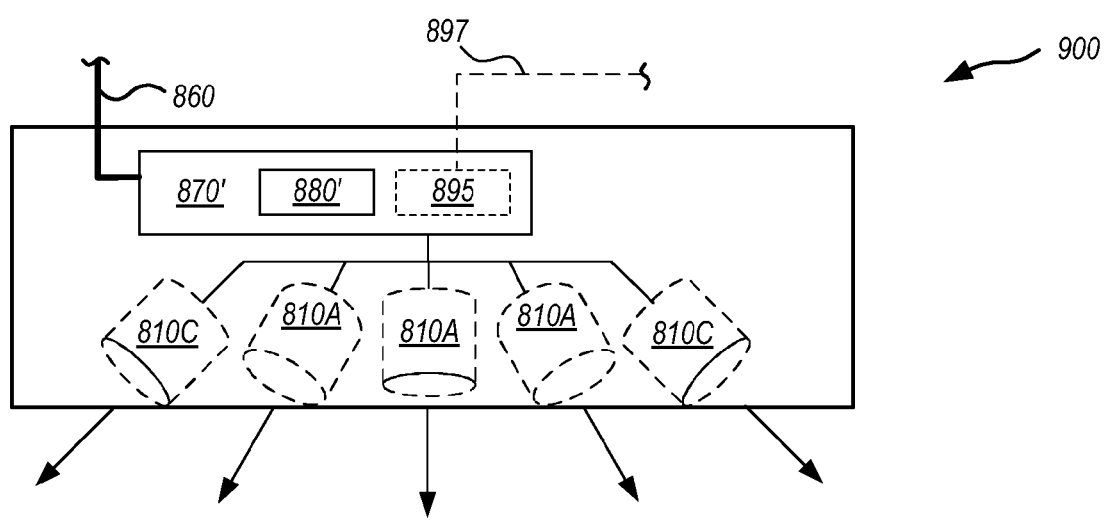
FIG. 9B is a schematic cross sectional view of the light fixture of FIG. 9A.

Note in the example above, that all of the analysis occurs in controller 880 of light fixture 700(2) and that light fixture 700(1) merely implements a command to dim light sources 810C. This type of operation creates an opportunity for implementing "master" and "slave" type units wherein the "masters" can provide lighting, gather and analyze images or other information, dim light sources, and generate commands based on analysis results, whereas the "slaves" merely provide lighting and obey commands from the "masters." FIGS. 8A and 8B therefore illustrate a "master" light fixture according to this concept. FIGS. 9A and 9B illustrate a "slave" light fixture 900 in schematic bottom plan and cross-sectional views similar to the views of FIGS. 8A and 8B. The components of "slave" light fixture 900 are identical to those in "master" light fixture 800 except that light fixture 900 does not include a camera, and includes electronics 870' having only communication module 895 and a modified controller 880' that implements commands received by communication module 895. The second example of operation noted above would work equally well with light fixture 700(2) implemented by a light fixture 800 and light fixture 700(1) implemented by a light fixture 900.

It is further contemplated that large areas and volumes may be illuminated by light fixtures providing active glare control, wherein at least some of the light fixtures are capable of gathering information about objects of interest and at least some of the light fixtures that provide low-angle light can be dimmed to reduce glare. In such situations, controllers may successfully identify and minimize low-angle light reaching multiple objects of interest within the lighted areas; however it is possible that the area may become populated with so many objects of interest that the dimming and brightening of low-angle light may become distracting. Controllers 880 may be configured to recognize such cases and to respond by turning off the selective dimming feature (e.g., turning on even low-angle light sources to their default or brightest states) or by selectively dimming all of the low-angle lighting in the area by a fixed amount, thereby providing some task lighting while reducing glare somewhat.

Figure 10:
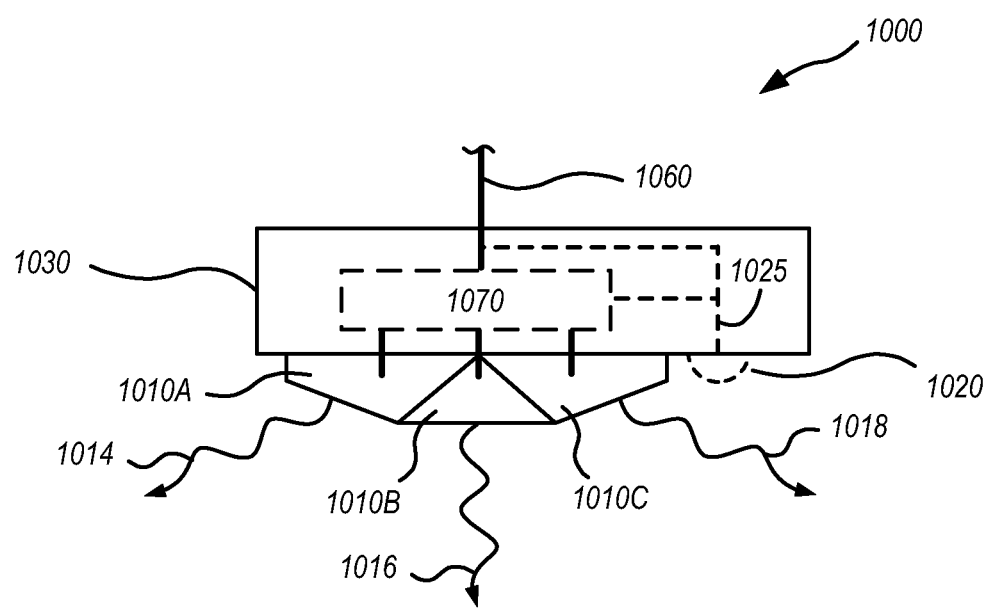
FIG. 10 schematically illustrates a light fixture 1000 that adjusts delivered light, in an embodiment.

Knowledge of more information, such as position, travel direction and/or orientation of observers within the areas can lead to additional opportunities to adjust delivered light to maximize visibility while minimizing glare. FIG. 10 schematically illustrates a light fixture 1000 that adjusts delivered light in this fashion, and FIG. 11 schematically illustrates a lighting scenario that advantageously uses light fixtures 1000.

In FIG. 10, light fixture 1000 includes a housing 1030 and three light sources 1010A, 1010B and 1010C. Light that is selectively emitted by light sources 1010A, 1010B and 1010C is directional and is denoted as light 1014, 1016 and 1018, as shown. Light 1016 is high-angle light illuminating a first portion of an activity volume (e.g., emitted generally downwardly at angular illumination less than 45 degrees from normal of light source 1010B) while light 1014 and 1018 are low-angle light (e.g., emitted generally sideways at angular illumination greater than 45 degrees from normal of light source 1010B) illuminating second and third portions of an activity volume different from the first portion. An optional sensor 1020 may be a rangefinder, light sensor, a motion sensor or a camera that can generate more detailed information than either of a light or motion sensor. Power is supplied to light fixture 1000 through cable 1060 which may be a single conductor (e.g., for DC power; and wherein the light fixture is grounded via its support) a paired conductor (e.g., for AC power) or a set of conductors, each of which is specific to one of the light sources 1010A, 1010B, 1010C. Optional electronics 1070 may be included to split and control power from cable 1060 to light sources 1010A, 1010B, 1010C; when electronics 1070 are included, motion sensor 1020 may communicate thereto over a signal path 1025. When electronics 1070 are not included, motion sensor 1020 may still be present but signal path 1025 communicates directly to cable 1060.

When sensor 1020 is present and electronics 1070 are configured accordingly, light fixture 1000 may be considered a "master" light fixture capable of gathering and analyzing data, and adjusting light sources 1010A, 1010B and/or 1010C; information obtained by sensor 1020 may also be fed back to cable 1060 (e.g., to other light fixtures 1000, or to a computer host or server). When sensor 1020 is not present, light fixture 1000 may be considered a "slave" light fixture in the sense that it adjusts light sources 1010A, 1010B and/or 1010C according to external input. Such input may be received through cable 1060 and executed by electronics 1070, or may simply result from separate power inputs being supplied through cable 1060 for light sources 1010A, 1010B and/or 1010C. Therefore, in addition to power, cable 1060 may optionally supply information to and from light fixture 1000.

Figure 11:
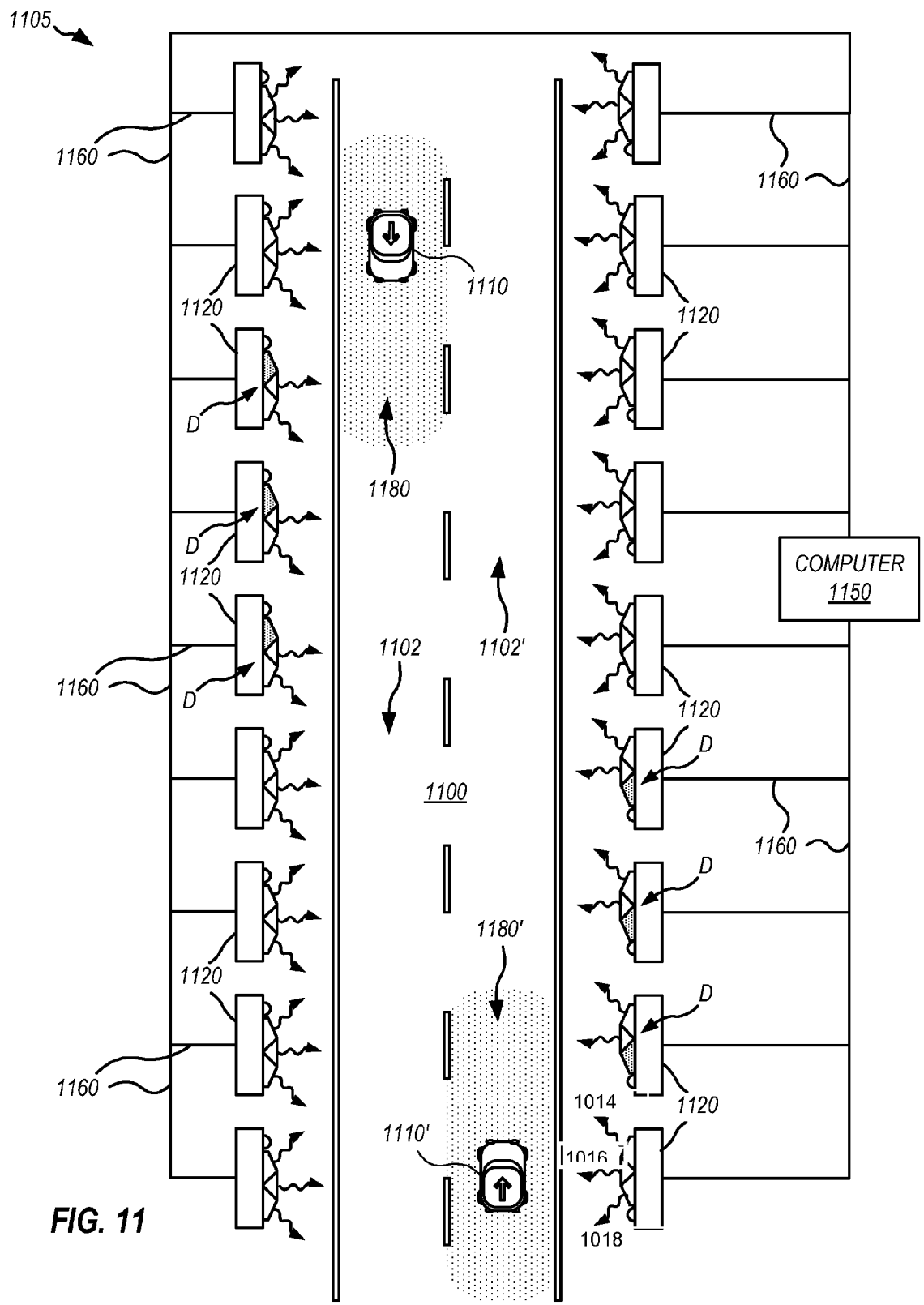
FIG. 11 schematically illustrates a lighting scenario that advantageously uses the light fixtures of FIG. 10, in an embodiment.

In certain embodiments, all input derived from sensors 1020 is accumulated and processed by a computer system external to all light sources 1000 (not shown in FIG. 10; see FIG. 11). That is, electronics 1070 may not be included in housing 1030, but instead may be located external thereto. In these embodiments, the computer system then dictates the operation of light sources 1010A, 1010B and 1010C of each light source 1000. This may be done directly (by supplying and adjusting power to each light source 1010 through cable 1060) or indirectly (by supplying information through cable 1060, whereupon electronics 1070 process the information and adjust power to light sources 1010A, 1010B and 1010C locally).

FIG. 11 is a schematic diagram of a roadway 1100 illuminated by a system 1105 of light fixtures 1120 that may be for example light fixtures 1000, FIG. 10. Vehicles 1110, 1110' travel along lanes 1102, 1102' of roadway 1100, respectively, in directions shown by an arrow on each vehicle. Light fixtures 1120 are shown adjacent to roadway 1100 for illustrative clarity, but it is understood that light fixtures 1120 may be located either adjacent to or over roadway 1100. Placement of light fixtures 1120 over roadway 1100 may be advantageous for managing directionality of lighting of roadway 1100, as now explained.

As shown in FIG. 11, each light fixture 1120 connects to a computer 1150 through a cable 1160. As should be appreciated by those skilled in the art, cable 1160 may represent a wireless or wired connection to computer 1150. Sensors on light fixtures 1120 collect information and send the information to computer 1150 through cable 1160 (certain branches of cable 1160, certain light fixtures 1120, and the sensors, are not labeled in FIG. 11 for clarity of illustration; see sensors 1020, FIG. 10). Computer 1150 utilizes the collected information to determine at least the position, and possibly the speed, of each vehicle 1110 on roadway 1110. In a normal state of each light fixture 1120, both high and low-angle light are emitted, as shown by arrows resembling the arrows denoted as light 1014, 1016 and 1018 in FIG. 10. However, when position and/or speed of a vehicle 1110, 1110' is determined, computer 1150 directs certain light fixtures 1120 designated as D in FIG. 11 to dim at least low-angle rays in the direction of vehicle 1110, 1110'. In certain embodiments, high-angle rays may be dimmed as well (see FIG. 12). However in environments such as a multilane roadway it may be advantageous to maintain high-angle lighting so that drivers of vehicles can continue to see other vehicles. The degree of low-angle light dimming may be optimized for a given situation. In certain embodiments, the low-angle light selected for dimming is completely turned off while in other embodiments it is dimmed by some fraction of its normal brightness. Also, designation of light fixtures as D is not limited to a simple switching between a single normal state (all light sources "on") and a single dimmed state. In embodiments, brightness of low-angle light is varied within a continuum of brightness levels as a vehicle nears or passes the dimmed light fixture.

Within FIG. 11, each light fixture 1120 is similar to light fixture 1000, discussed above. Accordingly, each fixture 1120 includes at least a first light source illuminating a first portion of an activity volume terminating at a support surface (in this case support surface is roadway 1100), and a second light source illuminating a second portion of the activity volume different than the first portion. For example, first light source illuminates light 1016 substantially downward towards roadway 1100, and second light source illuminates light 1018 towards roadway in the direction of oncoming traffic. Moreover, in certain embodiments, each fixture 1120 may include a third light source illuminating light 1014 in a third direction, such as in the direction the same as the direction of travel of a vehicle on the roadway. When vehicle 1110' is located on roadway 1100 in the region illuminated by light 1018, the light 1018 may be dimmed.

The effect of system 1105 as seen by a driver of vehicles 1110, 1110' is that the roadway is well lit, but low-angle rays from light fixtures 1120 are reduced. Each vehicle 1110, 1110' essentially travels in a respective partial shadow 1180, 1180' that moves with the vehicle as computer 1150 adjusts the designation of light fixtures as D. The partial shadows are inconsequential to the driver of each vehicle because the features that the driver needs to see outside the vehicle are all well-lit, receiving both high-angle rays, and low-angle rays traveling away from the driver's perspective. As noted above, system 1105 may determine position and/or speed of vehicles 1110, 1110'. When position alone is determined, the designation of individual light fixtures 1120 as D may be updated upon each determination of position. When speed is also determined, computer 1150 may calculate future position information of vehicles 1110, 1110' based on their position and speed at a given time, and designate individual light fixtures as D based on the future position information. Depending on the intervals at which information is gathered and designations are updated, designating individual light fixtures as D based on the future position information may lead to smoother light adjustment performance of system 1105. System 1105 may also dim lights only when vehicles 1110, 1110' on roadway 1100 are moving within a reasonable set of speed limits. For example it may be advantageous to cancel the dimming function and turn all available light sources to their normal "on" settings if any of vehicles 1110, 1110' cease to move (e.g. due to a traffic backup or accident).

Although system 1105 is shown as including cabling 1160 and computer 1150, system 1105 may, alternatively, be implemented without computer 1150 and cabling 1160; that is, as a system of "stand alone" light fixtures 1120. In this embodiment, each light fixture 1120 has a sensor of sufficient quality or resolution to determine when observers are within its field of illumination and moving towards it. Such an embodiment is similar to a collection of light fixtures 700 as shown in FIG. 7, light fixtures 800, FIGS. 8A, 8B and/or light fixtures 900, FIGS. 9A, 9B. For example, specific light fixtures 1120 may be "master" light fixtures (e.g., light fixtures 800) while other light fixtures 1120 are "slave" light fixtures (e.g., light fixtures 900).

Figure 12:
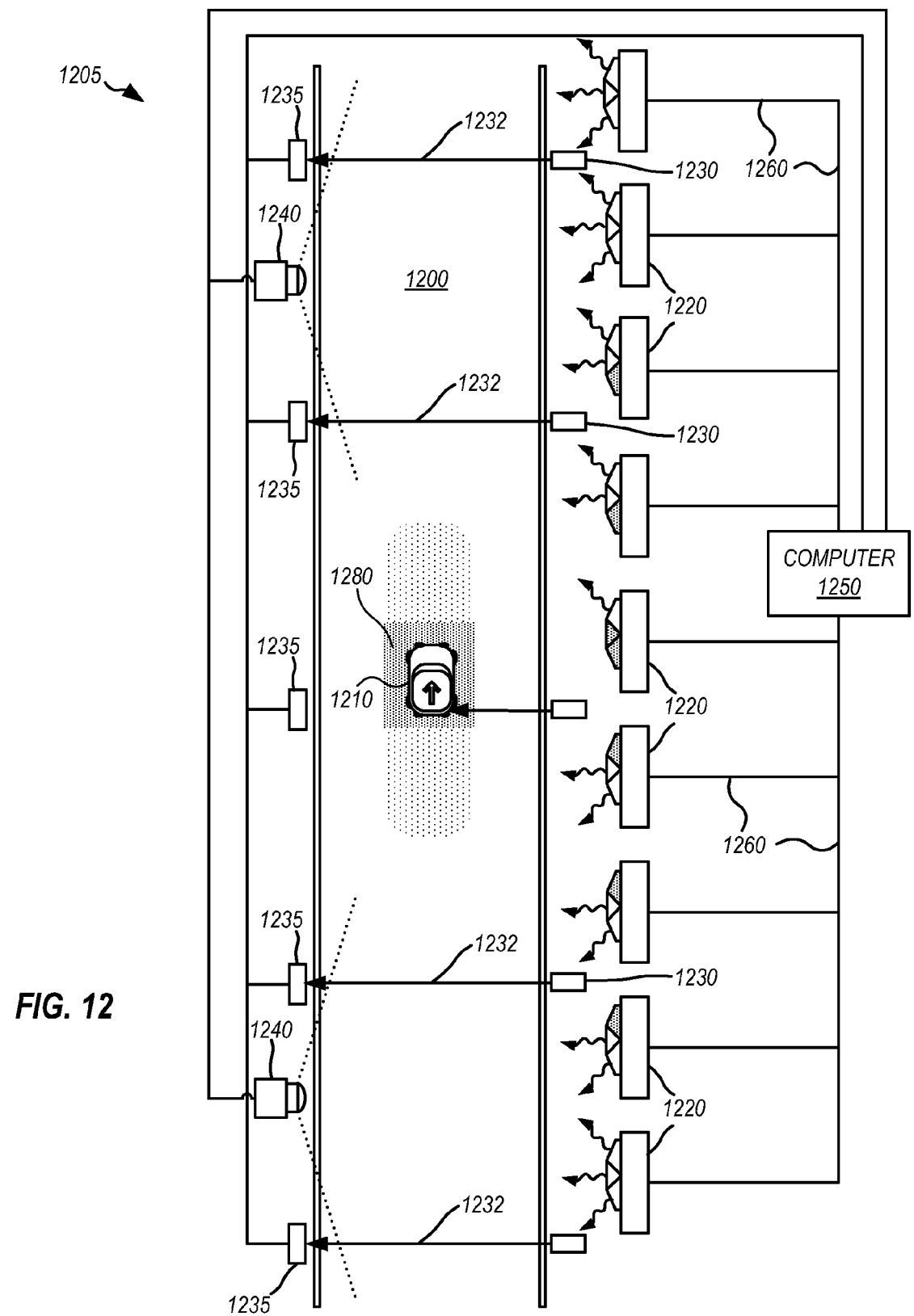
FIG. 12 is a schematic diagram of a roadway illuminated by a system of light fixtures that may be, for example, the light fixtures of FIG. 10, in an embodiment.

In still other embodiments, systems of light fixtures providing active glare control substantially separate the tasks of detecting information about objects within a lighted area from light fixtures that provide lighting to the area. FIG. 12 is a schematic diagram of a vehicle 1210 passing over a roadway 1200 that is illuminated by a system 1205. Roadway 1200 is configured for one-directional traffic flow (e.g., a one-way road, possibly a single lane tunnel). System 1205 includes light fixtures 1220 that are shown adjacent to roadway 1200 for illustrative clarity, but it is understood that light fixtures 1220 may be located either adjacent to or over roadway 1100. Light fixtures 1220 may be similar to light fixtures 1000, FIG. 10, but may lack optional sensor 1020 because system 1205 can gather information in other ways, as now described.

In an embodiment, optional light emitters 1230 emit light 1232 across roadway 1200 such that vehicle 1210, when present, blocks light 1232 before it reaches corresponding receivers 1235. Receivers 1235 sense the presence or absence of light 1232 and send corresponding information to computer 1250, which analyzes the information to determine position and/or speed of vehicle 1210 and directs certain light fixtures 1220 through cables 1260 to dim at least low-angle rays in the direction of vehicle 1210. FIG. 12 shows high-angle rays also being dimmed in the immediate vicinity of vehicle 1210 such that vehicle 1210 travels in a fairly pronounced shadow 1280. This arrangement may be most useful in single lane, unidirectional traffic applications where other vehicles (that need to see vehicle 1210) are not likely to be present. Alternatively, computer 1250 is configured to detect when two vehicles 1210 are present within a predetermined distance of one another, and to alter the dimming arrangement in response, such that light is provided for drivers of each such vehicle to be able to see the other vehicle.

In another embodiment, light emitters 1230 are not present. In such embodiment, receivers 1235 are embedded in roadway 1200 such that receivers 1235 detect the light from light fixtures 1220 except when such light is blocked by a passing vehicle. In this case, it may be advantageous not to extinguish light from light fixtures 1220 completely when a vehicle 1210 passes, such that at least a dim light always remains on for detectability by receivers 1235.

In still another embodiment, light emitters 1230 and receivers 1235 are both omitted, and cameras 1240 are positioned to gather information through photography of roadway 1200 to reveal information of vehicles thereon. Cameras 1240 may for example include wide-angle optics such that each camera can gather information through a large viewing angle, reducing a total number of cameras 1240 required for a given roadway 1200.

For purposes herein, the use of the term "support surface" may include any surface desired to be lighted such as the ground, floors, roadways, etc. Moreover, although light is referenced as emitted above, light may additionally be generated, radiated, emitted, reflected, etc. without departing from the scope hereof.

The changes described above, and others, may be made in the lighting systems and methods providing active glare control described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A range-activated dimming light fixture providing active glare control, comprising:
    a first dimmable light source for downwardly illuminating an activity volume terminating at a support surface;

a rangefinder, operatively coupled with the first dimmable light source, for determining a distance between the first dimmable light source and a top of an object within the activity volume; and, a controller for determining a height between the top and the support surface, based on the distance, and configured to dim the first dimmable light source when the height exceeds a first threshold distance.

2. The range-activated dimming light fixture of claim 1, the controller further configured to dim the first dimmable light source to minimum brightness when the height exceeds a second threshold distance.

3. The range-activated dimming light fixture of claim 2, wherein the minimum brightness is between 1% to 10% of maximum brightness of the first dimmable light source.

4. The range-activated dimming light fixture of claim 1, wherein the rangefinder has a field of view that is narrower than angular illumination from the first dimmable light source.

5. The range-activated dimming light fixture of claim 1, further comprising:
 a second light source for lighting outside of the activity volume under control of the controller.

6. The range-activated dimming light fixture of claim 5, the controller further configured to maintain the second light source at constant brightness when the controller dims the first dimmable light source.

7. The range-activated dimming light fixture of claim 5, wherein the first dimmable light source illuminates at a solid angle corresponding to pi steradians.

8. A lighting system for illuminating an activity volume and providing active glare control, comprising:
 a first light fixture having:
  a first light source for illuminating a first portion of the activity volume, and a dimmable) LED light source for illuminating a second portion of the activity volume that is different from the first portion, wherein the dimmable LED light source is dimmable by the adjustment of power;
 a sensor for capturing data of the activity volume; and
 a controller for (a) determining, from the data, an activity location on a support surface terminating the activity volume, and (b) dimming the dimmable LED light source when the activity location is within the second portion.

9. The lighting system of claim 8, wherein the support surface is a roadway.

10. The lighting system of claim 9, wherein the second portion is in a direction of an oncoming vehicle travelling on the roadway, and wherein the activity location is based on the location of the oncoming vehicle.

11. The lighting system of claim 9, wherein the first light fixture comprises an additional light source for lighting a third portion of the activity volume that is different from the first and second portions and corresponding to a direction of travel of a vehicle travelling on the roadway.

12. The lighting system of claim 9, the controller determining the activity location at least in part based on position of a vehicle traveling on the roadway.

13. The lighting system of claim 9, the controller determining the activity location at least in part on speed of a vehicle traveling on the roadway.

14. The lighting system of claim 8, further comprising:
 a second light fixture adjacent to the first light fixture having:
  a second light source for illuminating a third portion of the activity volume overlapping in part with the first portion; and
 wherein the controller dims the second light source when the activity location is within first and third portions.

* * * * *